(12) United States Patent
Azara et al.

(10) Patent No.: US 7,283,958 B2
(45) Date of Patent: Oct. 16, 2007

(54) SYSTEMS AND METHOD FOR RESOLVING AMBIGUITY

(75) Inventors: Misty Azara, Seattle, WA (US); Livia Polanyi, Palo Alto, CA (US); Giovanni L. Thione, San Francisco, CA (US); Martin H Van Den Berg, Palo Alto, CA (US)

(73) Assignee: Fuji Xexox Co., Ltd., Tokyo (JP)

( * ) Notice: Subject to any disclaimer, the term of this patent is extended or adjusted under 35 U.S.C. 154(b) by 756 days.

(21) Appl. No.: 10/807,532

(22) Filed: Mar. 23, 2004

(65) Prior Publication Data
US 2005/0182619 A1 Aug. 18, 2005

Related U.S. Application Data

(63) Continuation-in-part of application No. 10/781,443, filed on Feb. 18, 2004.

(51) Int. Cl.
*G10L 21/00* (2006.01)

(52) U.S. Cl. .......................... 704/257; 704/9
(58) Field of Classification Search ............... None
See application file for complete search history.

(56) References Cited

U.S. PATENT DOCUMENTS

| | | | |
|---|---|---|---|
| 5,751,907 A | 5/1998 | Moebius et al. | |
| 5,790,978 A | 8/1998 | Olive et al. | |
| 2004/0049391 A1* | 3/2004 | Polanyi et al. | 704/271 |
| 2005/0086592 A1 | 4/2005 | Polanyi et al. | |
| 2005/0171926 A1 | 8/2005 | Thione | |
| 2005/0182618 A1 | 8/2005 | Azara et al. | |
| 2005/0182625 A1 | 8/2005 | Azara et al. | |
| 2005/0187772 A1 | 8/2005 | Azara et al. | |

OTHER PUBLICATIONS

Jurafsky et al.; Automatic Detection of Discourse Structure for Speech Recognition and Understanding; Automatic Speech Recognition and Understanding, 1997. Proceedings., 1997 on Dec. 14-17, 1997 pp. 88-95.*
Levow, G., "Prosodic Cues to Discourse Segment Boundaries in Human-Computer Dialogue", in 5th SIGdial Workshop on Discourse and Dialogue Boston, Apr. 30 and May 1, 2004.
Lascarides, A. and Oberlander, J., "Temporal Coherence and Defeasible Knowledge", Theoretical Linguistics, 19.1, pp. 1-35, Walter de Gruyter, Berlin, New York, 1993.

(Continued)

*Primary Examiner*—Abul K. Azad
(74) *Attorney, Agent, or Firm*—Sughrue Mion, PLLC.; Pavel I. Pogodin

(57) ABSTRACT

Techniques are provided for resolving ambiguity in natural language speech. Speech is recognized using automatic speech recognition. A theory of discourse analysis is determined and at least one set of candidate discourse functions is determined based on the theory of discourse analysis. Prosodic features in the speech and a correlation between the prosodic features and the discourse functions is determined. The sets of candidate discourse functions are ranked based on the prosodic features in the speech information and a correlation to the prosodic features expected for the determined discourse functions. Ambiguity is resolved between sets of candidate discourse functions based on the rank information.

19 Claims, 14 Drawing Sheets

OTHER PUBLICATIONS

"CHATR: A Generic Speech Synthesis System", Dec. 25, 1997, downloaded from http://feast.atr.jp/chatr/manual/index.html Mar. 16, 2006.

"HCRC Project: ID4S Intonation in Dialogue for Speech Recognition", downloaded from http://www.hcrc.ed.ac.uk/Site/IDS4.html Jun. 2, 2004.

Nuance Say Anything Grammars product description, downloaded from http://cafe/bevocal.com/docs/grammar/sayanthing.html Jun. 2, 2004.

Liolje, A., "The AT&T LVCSR-2001 System", May 3, 2001, downloaded from ftp://jaguar.ncsl.nist.gov/evaluations/hub5/may01/pres/aft_lvcsr.pdf Mar. 16, 2006.

DARPA Communicator Project: Robust Recognition and Dialog Tracking for Interactive Information Access, Mar. 2003, downloaded from http:/ssli.ee.washington.edu/projects/communicator.html Mar. 15, 2006.

Ayers, G.M., 1992. "Discourse functions of pitch range in spontaneous and read speech." Presented at the Linguistic Society of America Annual Meeting.

Brown, G. and Kenworthy, J. 1980 Questions of Intonation, Baltimore, University Park Press, p. 21-122.

Kamp, H. 1981. "A Theory of of Truth and Semantic Representation." in J.A.G. Groenendijk, T. Jannssen, and M. Stokhof (eds.) Formal Methods in the Study of Language, Amesterdam: Mathematisch Centrum, 277-322.

Ladd, D.R. 1983, "Phonological Features of Intonation Peaks", Language, 59:721-759.

Ladd, D.R. 1988. "Declination Reset and the Hierarchical Organization of Utterances" Journal of the Acoustical Society of America, 84(2):530-544.

Mariani, J.; Proubeck, P., 1999 "Language Technologies Evaluation in the European Framework", Proceedings of the DARPA Broadcast News Worksop, Washington: Morgan Kaufman Publishers, pp. 237-242.

Nakatani, C.; Hirschberg, J.; and Grosz, 1995. "Discourse Structure in Spoken Language: Studies on Speech Corpora." In Working Notes of the AAAI-95 Spring Symposium in Palo Alto, CA in Empirical Methods in Discourse Interpretation. pp. 106-112.

Polanyi, L.; and Sch, R., 1984. "A syntactic approach to discourse semantics." Proceedings of the 10th International Conference on Computational Linguistics, Stanford, CA 413-419.

Silverman, K.; Bockman, M.; Pierrehumbert, J.; Ostendorf, M.; Wightman, C.; Price, P.; and Hirschberg, J. 1992. "ToBI: A standard scheme for labeling prosody." In Proceedings of ICSLP. Banff: International Conference on Spoken Language Processing.

Terken, J. 1984. "The distribution of pitch accents in instructions as a function of discourse structure." Language and Speech, 27:269-289.

Black A.; Taylor, P.: CHATR: a generic speech synthesis system in Proceedings of COLING74, II p. 83-986, Kyoto, 1994.

Haller, S. Fossum, T.: "The Association Between Subject Matter and Discourse Segmentation", In The Proceedings off the Florida AI Research Symposium, Key West, FL, May 2001.

Long, S.; Kooper, R.;Abowd, G.; Atkeson, C., "Rapid Prototyping of Mobile Context-Aware Applications: the CyberGuide Case Study", in the Proceedings of the 2nd ACM International Conference on Mobile Computing and Networking (MobiCom'96), pp. 97-107, Nov. 10-12, 1996.

Shriberg, E.; Stolke, A.; Hakkani-Tur, Dilek; Tur, Gokhan, "Prosody-Based Automatic Segmentation of Speech Utterances into Sentences and Topics" in Speech Communication, 2000, 32, 1-2, Sep. pp. 127-154.

Stolcke., A.; Schriberg., E.; Bates, R.; Coccaro N.; Jurafsky, D.; Martin, R.; Meteer, M.; Ries, K.: Taylor, P.: Van Ess-Dykema, C., "Dialog Act Modeling for Conversational Speech" in Applying Machine Learning to Discourse Proceesing. Papers from the 1998 AAAI Spring Symposium, Technical Report SS-98-01 (J. Chu-Carroll et al, eds.) Stanford CA pp. 98-105, AAAI Press, Menlo Park CA. 1998.

Wrede, B.; Schriberg, E., "Spotting 'HotSpots' in Meetings: Human Judgements and Prosdic Cues" in Proc. Eurospeech, Geneva, 2003.

Lascardies, A. and Oberlander, J., "Temporal Coherence and Defeasible Knowledge", Theoretical Linguistics, 19.1, pp. 1-35, Walter de Gruyter, Berlin, New York, 1993.

\* cited by examiner

| PREDICTION VALUE | DISCOURSE FUNCTION |
|---|---|
| 1.0 | DISCOURSE FUNCTION_A+ DISCOURSE_FUNCTION_B |
| 0.33 | DISCOURSE_FUNCTION_C |

Fig. 25

SYSTEMS AND METHOD FOR RESOLVING AMBIGUITY

This application is a continuation-in-part of currently pending U.S. application Ser. No. 10/781,443, filed on Feb. 18, 2004.

INCORPORATION BY REFERENCE

This Application herein incorporates by reference:

U.S. patent application Ser. No. 10/781,443, entitled "Systems and Methods for Determining Predictive Models of Discourse Functions" by M. Azara et al.;

U.S. patent application Ser. No. 10/785,199, entitled "Systems and Methods for Synthesizing Speech Using Discourse Function Level Prosodic Features" by M. Azara et al.;

U.S. patent application Ser. No. 10/807,009, entitled "Systems and Methods for Determining and Using Interaction Models", by M. Azara et al.;

U.S. patent application Ser. No. 10/684,508, entitled "Systems and Methods for Hybrid Text Summarization", by L. POLANYI et al., each, in their entirety.

BACKGROUND OF THE INVENTION

1. Field of Invention

This invention relates to natural language processing.

2. Description of Related Art

Natural language contains various types of ambiguity. Human recipients of natural language easily resolve these ambiguities. However, when natural language is used as an interface to machines and devices, ambiguity can create problems. In particular, when human generated speech is used to control computer applications through a natural language interface, natural language ambiguity complicates the design of the interface.

Some researchers have attempted to add additional information resources to conventional automatic speech recognition systems to aid in resolving these ambiguities. For example, some conventional systems use facts and other world knowledge to resolve natural language ambiguity based on the communicative content of the speech. Unfortunately, knowledge based resolution mechanisms tend to be computationally expensive and difficult to implement in dynamic and/or interactive environments.

User's of natural language interfaces do not typically intend to inject ambiguity into the speech. Rather, the ambiguity results from the variety of user, genre and topic-specific ambiguity resolution mechanisms used by human speech recipients. Some researchers have attempted to create natural language user interfaces that use the explicit communicative content of speech information to determine the speaker's intention. Since these conventional systems depend on the speech content, they are limited to resolving ambiguity based on the dialogue context.

SUMMARY OF THE INVENTION

Systems and methods for resolving ambiguity based on prosodic features and discourse functions would therefore be useful. The systems and methods according to this invention determine the intended meaning of natural language at the discourse function level. The intended meaning is determined based on segmentations of the speech into candidate discourse functions and correlated with identified prosodic features. In various exemplary embodiments according to this invention, sets of candidate discourse functions are determined for recognized speech information based on a theory of discourse analysis. The sets of candidate discourse functions reflect the types of natural language ambiguity contained in the speech information. The prosodic features of the speech information are determined. The sets of candidate discourse functions are then ranked based on a correlation between the number of prosodic features identified in the speech information and the number of prosodic features expected for each set of candidate discourse functions. The ambiguities in the speech information are resolved based on the determined rank of the set of candidate discourse functions.

In one of the exemplary embodiments according to this invention, the discourse functions are determined using the Unified Linguistic Discourse Model theory of discourse analysis of Polanyi et al., as further described in co-pending co-assigned U.S. patent application Ser. No. 10/684,508, entitled "Systems and Methods for Hybrid Text Summarization", filed Oct. 15, 2003, and incorporated herein by reference in its entirety.

In various other exemplary embodiments according to this invention, the correlation between the prosodic features identified in the speech and the expected prosodic features are determined using the predictive model of discourse functions, as described in co-assigned, co-pending U.S. patent application Ser. No. 10/781,443, by Azara et al., entitled "Systems and Methods for Determining Predictive Models of Discourse Functions", filed on Feb. 18, 2004 and incorporated herein by reference in its entirety.

BRIEF DESCRIPTION OF THE DRAWINGS

FIG. 25 shows an exemplary data structure for storing ranked sets of candidate discourse functions according to an aspect of this invention.

DETAILED DESCRIPTION OF EXEMPLARY EMBODIMENTS

Figure 1:
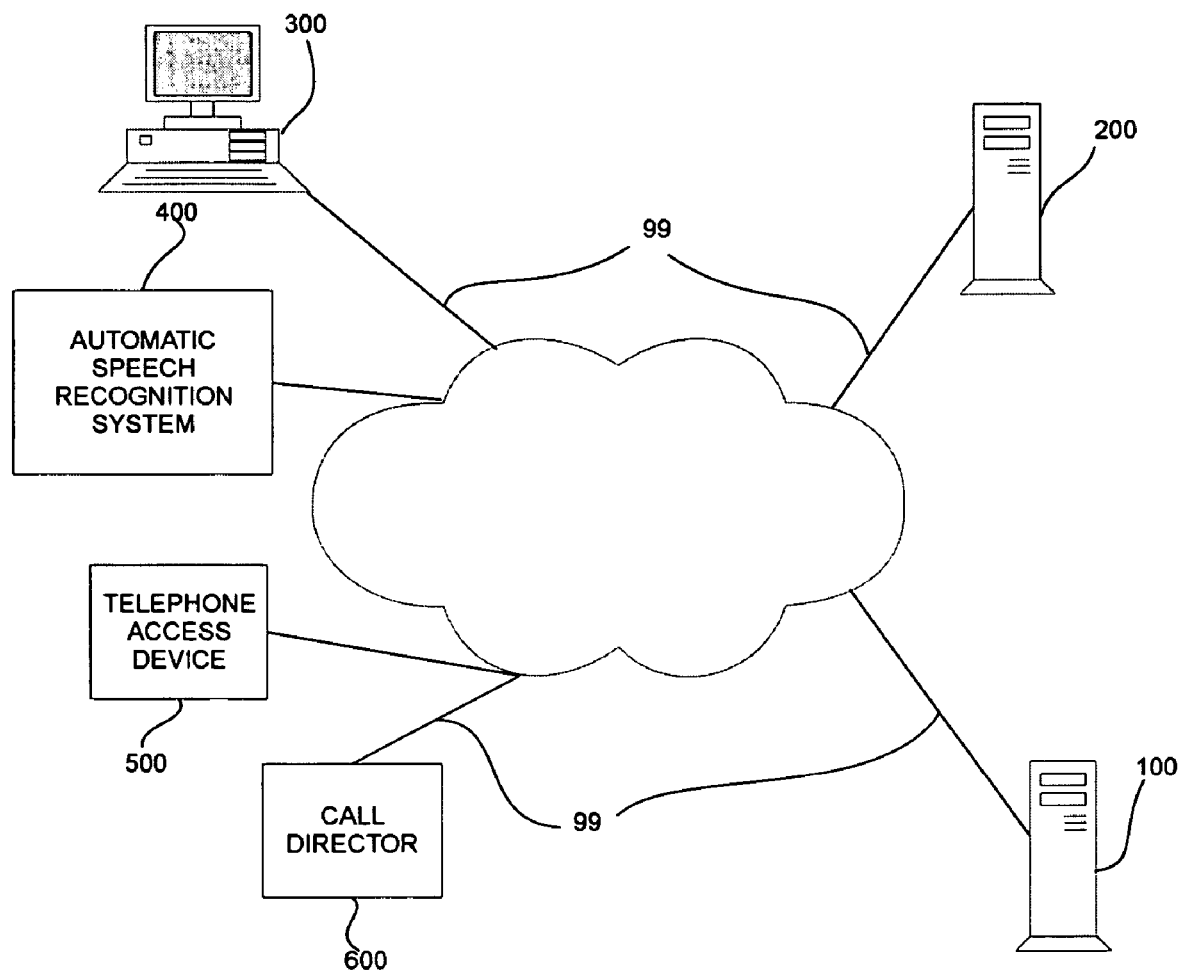
FIG. 1 is an overview of an exemplary system for resolving ambiguity according to one aspect of this invention.

FIG. 1 is an overview of an exemplary system for resolving ambiguity according to one aspect of this invention. The system for resolving ambiguity 100 is connected via communications link 99 to an information repository 200; an internet-enabled personal computer 300; an automatic speech recognition system 400; a telephone access device 500; and a call director 600.

In one of the various exemplary embodiments according to this invention, a user of the telephone access device 500 requests the retrieval of telephone number information contained in the information repository 200 using the speech request "Please call that number with touch tone dialing". The speech request contains ambiguities which must be resolved before the command can be properly executed.

That is, the speech request may have been intended to mean that a call should be placed to a previously specified number, using a touch tone dialing sequence instead of a pulse dialing sequence. Alternatively, the speech request may have been intended to initiate a search of the user's telephone directory, located in the information repository 200, for the number for which the touch tone dialing option has been enabled.

The ambiguous speech request is forwarded over communications link 99 to the automatic speech recognition system 400. The automatic speech recognition system 400 recognizes the speech information in the ambiguous speech request and generates recognized speech information. The recognized speech information and the prosodic features in the speech information are then forwarded over the communications link 99 to the system for resolving ambiguity 100.

The system for resolving ambiguity 100 determines at least one set of candidate discourse functions for the recognized speech information. The expected prosodic features for each set of candidate discourse functions are compared to the prosodic features identified in the speech information. In various exemplary embodiments according to this invention, the expected prosodic features are based on a predictive model for discourse functions determined from a training corpus of speech information. The predictive model for discourse functions may be based on various subsets of the training corpus such as specific users, languages, speech genres or any other identifiable characteristic of the speech information.

The system for resolving ambiguity 100 ranks the prediction value of each set of candidate discourse functions for the recognized speech information. In one of the various exemplary embodiments according to this invention, the prediction value is based on the ratio of the number of identified prosodic features for each type of candidate discourse function and the number of expected prosodic features for each type of discourse function. In various other exemplary embodiments according to this invention, the prosodic features are weighted based on importance, language and/or other features.

The ambiguity is then resolved based on the ranked prediction value information. For example, in one of the exemplary embodiments according to this invention, the highest ranked set of candidate discourse functions is selected. It will be apparent that other information resources may also be used singly or in combination with the prediction value information without departing from the spirit or scope of this invention.

The system for resolving ambiguity 100 then disambiguates the speech request to eliminate the ambiguity and forwards the disambiguated request to the call director 600. The call director 600 may be a TellMe voice processing application, a VoCare™ and/or a VoComm™ Enhanced Voice Services Application from BeVocal, a Say Anything™ application, a Nuance Corporation Accuroute™ application, a telephone application programming interface (TAPI) compliant application and/or any other known or later developed system for processing information and initiating telephone calls.

The call director 600 uses the disambiguated request to 1) identify the previously mentioned number as "that number" or 2) retrieve the touch tone enabled telephone number from the user's telephone directory in the information repository 200. After the telephone number has been determined, the call director 600 initiates the dialing sequence for the user of the telephone access device 500.

In another exemplary embodiment according to this invention, the user of internet-enabled personal computer 300 uses speech to request an application program to "Please call that number with touch tone dialing". As discussed above, the ambiguities in the command can be interpreted to mean that: 1) the call should be placed to the indicated number using touch tone dialing; or 2) the call should be placed to the number which has the touch tone dialing option set. The speech information is forwarded via communications link 99 to the automatic speech recognition system 400 where the speech is recognized. The recognized speech information is then forwarded via the communications link 99 to the system for resolving ambiguity 100. A theory of discourse analysis is determined based on a user profile entry, the speech genre or some other speech characteristic. The system for resolving ambiguity 100 then determines prosodic features associated with the recognized speech information.

The prosodic features include, but are not limited to, initial pitch frequency, signal amplitude; rate of speech; silence duration and/or any other prosodic feature useful in identifying the discourse functions in the recognized speech information. The system for resolving ambiguities 100 then determines a predictive model of discourse functions. The predictive model of discourse functions may be determined as described in "Systems and Methods for Determining Predictive Models of Discourse Functions" by Azara et al., as discussed above. However, it will be apparent that any method of determining a model that predicts discourse functions based on prosodic features may also be used in the practice of this invention.

The system for resolving ambiguity 100 then determines candidate discourse functions in the recognized speech based on the theory of discourse analysis. Discourse functions are intra-sentential and/or inter-sentential phenomena that are used to accomplish task, text and interaction level discourse activities such as giving commands to systems, initializing tasks identifying speech recipients and marking discourse level structures such as the nucleus and satellite distinction described in Rhetorical Structures Theory, the coordination, subordination and N-aries, as described in the ULDM and the like. Thus, the discourse constituents of the selected theory of discourse analysis may correlate with a type of discourse function. In other cases, the discourse function reflects a relation between elements in the discourse.

The presence of more than one set of candidate discourse functions reflects alternate possible meanings associated with the speech information. Thus, if the recognized speech contains an ambiguity, the candidate discourse functions include the alternate candidate sets of discourse functions corresponding to the identified ambiguities. For example, the ambiguities in the phrase "Please call that number with touch tone dialing" are associated with candidate discourse functions 1) "Please call", "that number" and "with touch tone dialing"; and 2) "Please call", "that number with touch tone dialing". Thus, two sets of candidate discourse functions are determined.

A ranking of the discourse functions is then determined based on the predictive model of discourse functions. That is, the likelihood of each candidate discourse function is determined based on the identified prosodic features in the speech and the expected prosodic features as indicated by the predictive model of discourse functions. The ambiguities in the recognized speech information are then resolved based on the rank of each set of candidate discourse functions. It will be apparent that in various other exemplary embodiments according to this invention, the predictive model of discourse functions is based on the speech patterns of the specific users; the genres of the speech; and/or any other identifiable characteristic of the speech. Thus, user specific predictive models of discourse functions are used to disambiguate a user's speech based on user specific prosody, presentation and/or usage patterns.

Figure 2:
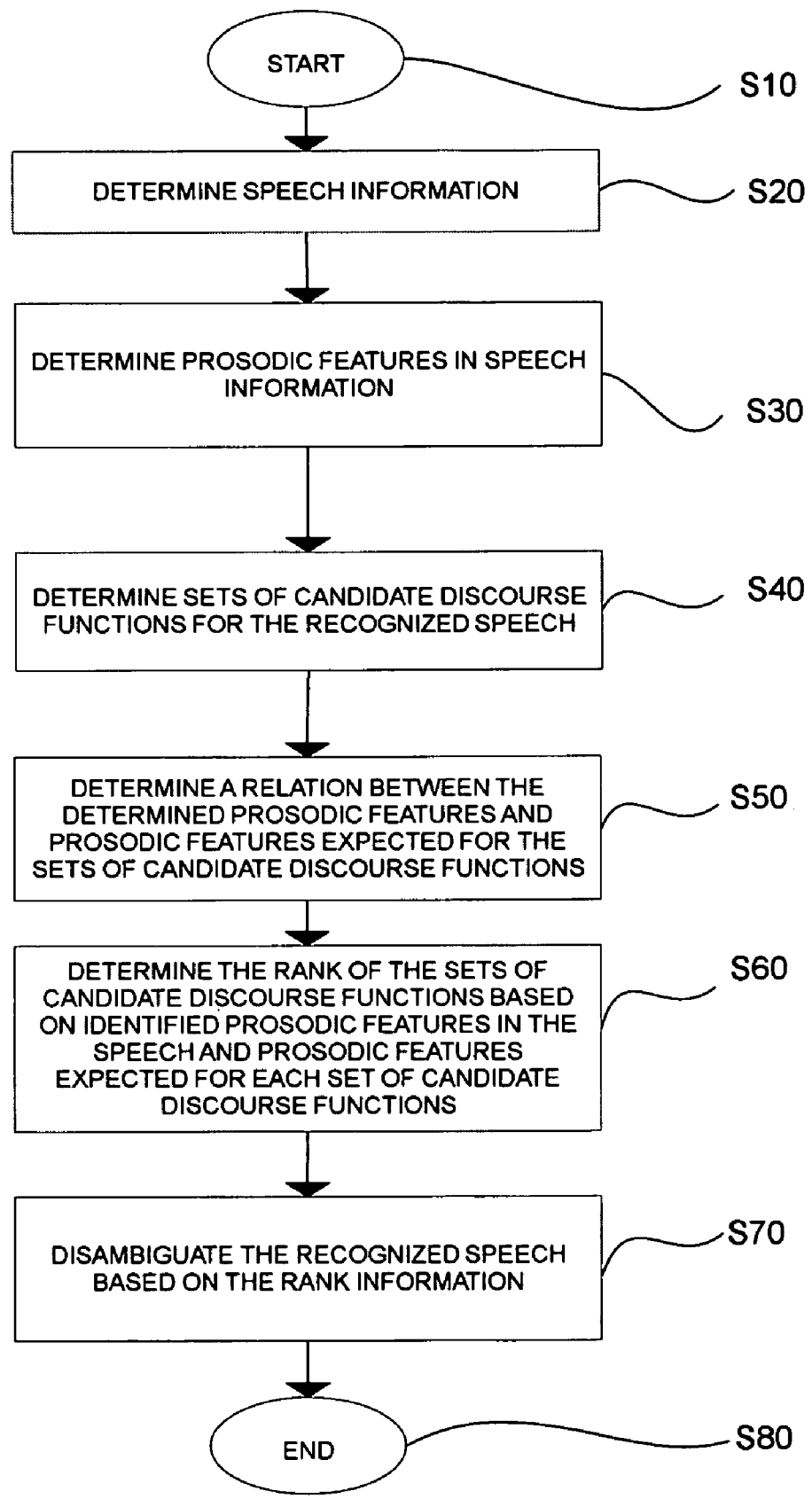
FIG. 2 is a first exemplary method for resolving ambiguity according to this invention.

FIG. 2 is a first exemplary method for resolving ambiguity according to this invention. The process begins at step S10 and immediately continues to step S20. In step S20, the speech information is determined. The speech information may be obtained from any source of natural language information. For example, television and radio broadcast information, recorded transcripts, human-computer commands, human-computer dictation and the like. The speech information is recognized using an automatic speech recognition system. After the speech information has been recognized, control continues to step S30 where the prosodic features are determined.

The prosodic features include but are not limited to pitch frequency, rate of speech, stress, number of intonational boundaries or any other known or later developed prosodic feature useful in determining discourse functions. After the prosodic features have been determined, control continues to step S40.

In step S40, sets of candidate discourse functions are determined for the recognized speech information. As discussed above, discourse functions are intra-sentential and/or inter-sentential phenomena that are used to accomplish task, text and interaction level discourse activities such as giving commands to systems, initializing tasks identifying speech recipients and marking discourse level structures. The sets of candidate discourse functions reflect the alternate meanings intended by the speaker and resolvable using the prosodic features and discourse functions. After the sets of candidate discourse functions have been determined, control continues to step S50.

A relation is determined between the prosodic features identified in the speech information and the expected prosodic features. The relation may be based on a predictive model for discourse functions. However, any method of determining relations between the prosodic features and the discourse functions may be used in the practice of this invention. After the relation between the identified prosodic features and the expected prosodic features has been determined, control continues to step S60.

In step S60, a prediction value is assigned for each set of candidate discourse functions based on the identified and the expected prosodic features. The prediction value may order the prediction values from high to low prediction values, group prediction values in classes and/quintiles, order the classes or use any other method of ordering the prediction values. After the prediction values for each set of candidate discourse functions has been determined, control continues to step S70 where the recognized speech information is disambiguated.

The speech information is disambiguated or resolved based on the rank of the sets of candidate discourse functions. Sets of candidate discourse functions that are more likely prosodically will rank higher. It will be apparent that rank information may also be combined with other types of information useful in resolving or disambiguating a sentence or phrase without departing from the spirit or scope of this invention. After the phrase has been disambiguated, control continues to step S80 and the process ends.

Figure 3:
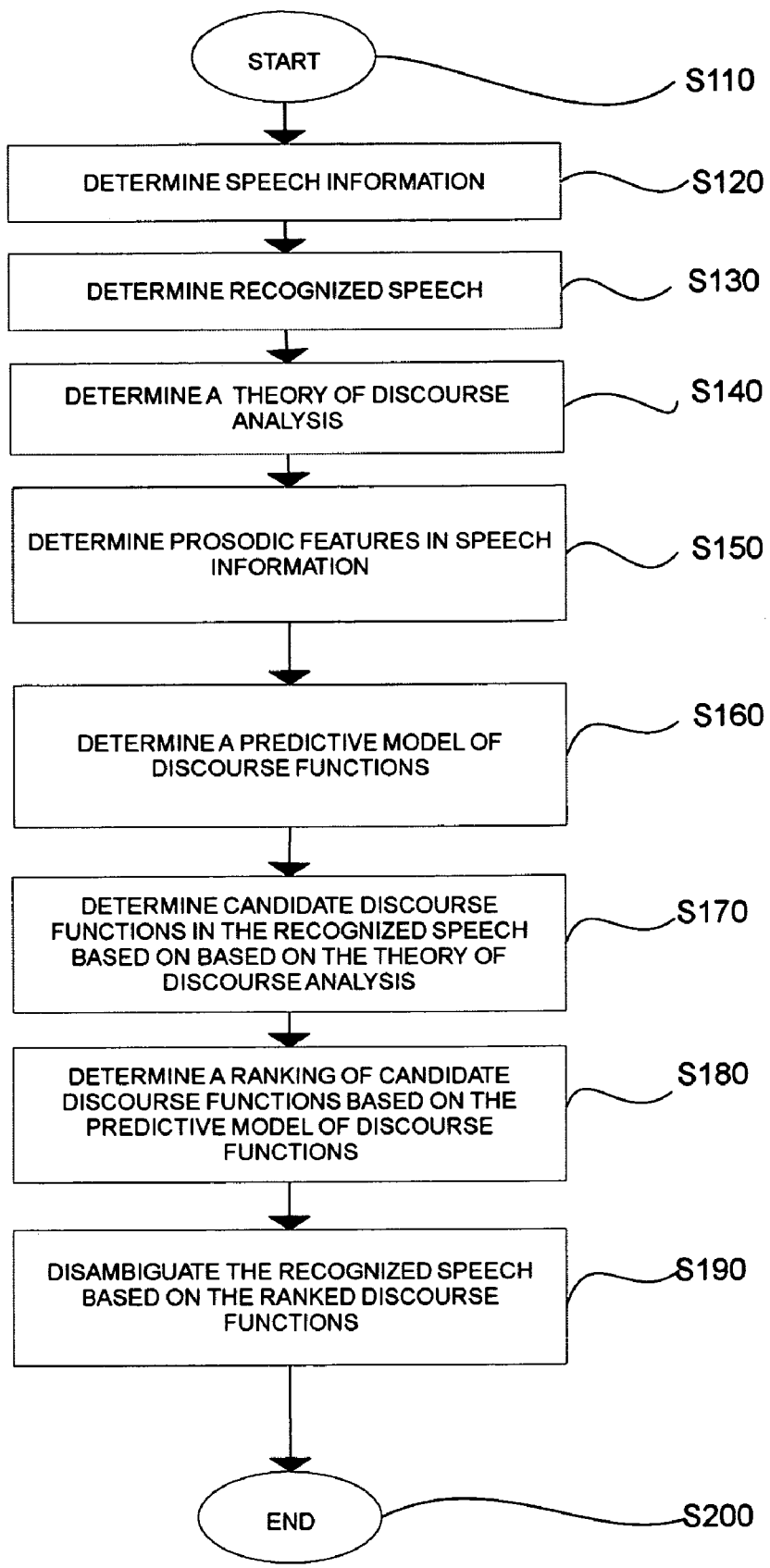
FIG. 3 is a second exemplary method for resolving ambiguity according to this invention.

FIG. 3 is a second exemplary method for resolving ambiguity according to this invention. The process begins at step S110 and immediately continues to step S120. In step S120, the speech information is determined. The speech information may be acquired from a lavaliere microphone, a microphone array or any other natural language input device. After the speech information has been acquired, control continues to step S130.

In step S130, the speech information is recognized. In various exemplary embodiments according to this invention, the speech information is recognized using a Nuance Corporation speech recognition system. However, any known or later developed automatic speech recognition system may also be used in the practice of this invention. Control then continues to step S140 where a theory of discourse analysis is determined.

In one of the exemplary embodiments according to this invention, the theory of discourse analysis is determined by retrieving a user profile that indicates a preferred theory of discourse analysis. However, in various other exemplary embodiments, the theory of discourse analysis is dynamically determined based on the speech genre or any other speech characteristic associated with the speech information. The determined theory of discourse analysis may include, but is not limited to, the Unified Linguistic Discourse Model (ULDM), Rhetorical Structures Theory or any other known or later developed discourse analysis theory capable of identifying discourse functions in the speech information. After the theory of discourse analysis has been determined, control continues to step S150.

In step S150, the prosodic features in the speech information are determined. The prosodic features are determined using signal analysis, annotation or any other method of determining prosodic features in the recognized speech information. After the prosodic features have been determined, control continues to step S160 where the predictive model of discourse functions is determined.

The predictive model of discourse functions is determined based on a user profile, dynamically based on the genre, topic of the speech information or any other user and/or speech characteristic. In various exemplary embodiments according to this invention, the predictive model of discourse functions is determined as described in the "Systems and Methods for Determining Predictive Models of Discourse Functions" by M. Azara et al., as discussed above. After the predictive model of discourse functions has been determined, control continues to step S170.

In step S170, the candidate discourse functions in the recognized speech are determined based on the theory of discourse analysis. As discussed above, discourse functions are intra-sentential and/or inter-sentential phenomena that are used to accomplish task, text and interaction level discourse activities such as giving commands to systems, initializing tasks identifying speech recipients and marking discourse level structures. Each set of candidate discourse functions reflects the possible alternate meanings intended by the speaker. Thus, in the case of attachment ambiguity, the relation between the modifier and the phrase to be modified may be unclear. However, the additional prosodic information provided by the speaker is used to select the set of candidate discourse functions for the speech information that more accurately reflects the intended meaning of the speaker. After the sets of candidate discourse functions have been determined, control continues to step S180.

The sets of candidate discourse functions are ranked in step S180. In one of the various exemplary embodiments according to this invention, the ranking is based on the number of prosodic features in the speech information that correlate or match with the prosodic features associated with the discourse functions in the predictive model of discourse functions. That is, the identified prosodic features in the speech are compared to the expected prosodic features associated with the discourse functions within the predictive model.

The most likely candidate discourse functions are associated with the largest number of prosodic features and/or the mostly highly weighted prosodic features. In various other exemplary embodiments according to this invention, the predictive model of discourse functions also encodes user specific characteristics including but not limited to patterns of speech and the like. In this way, the system for resolving ambiguity is made more responsive to the specific speech patterns of users. Control then continues to step S190.

In step S190, the recognized speech information is disambiguated based on the ranking of the candidate discourse functions. That is, the most likely candidate discourse functions are selected to resolve the ambiguity. After the recognized speech information is resolved, control continues to step S200 and the process ends.

Figure 4:
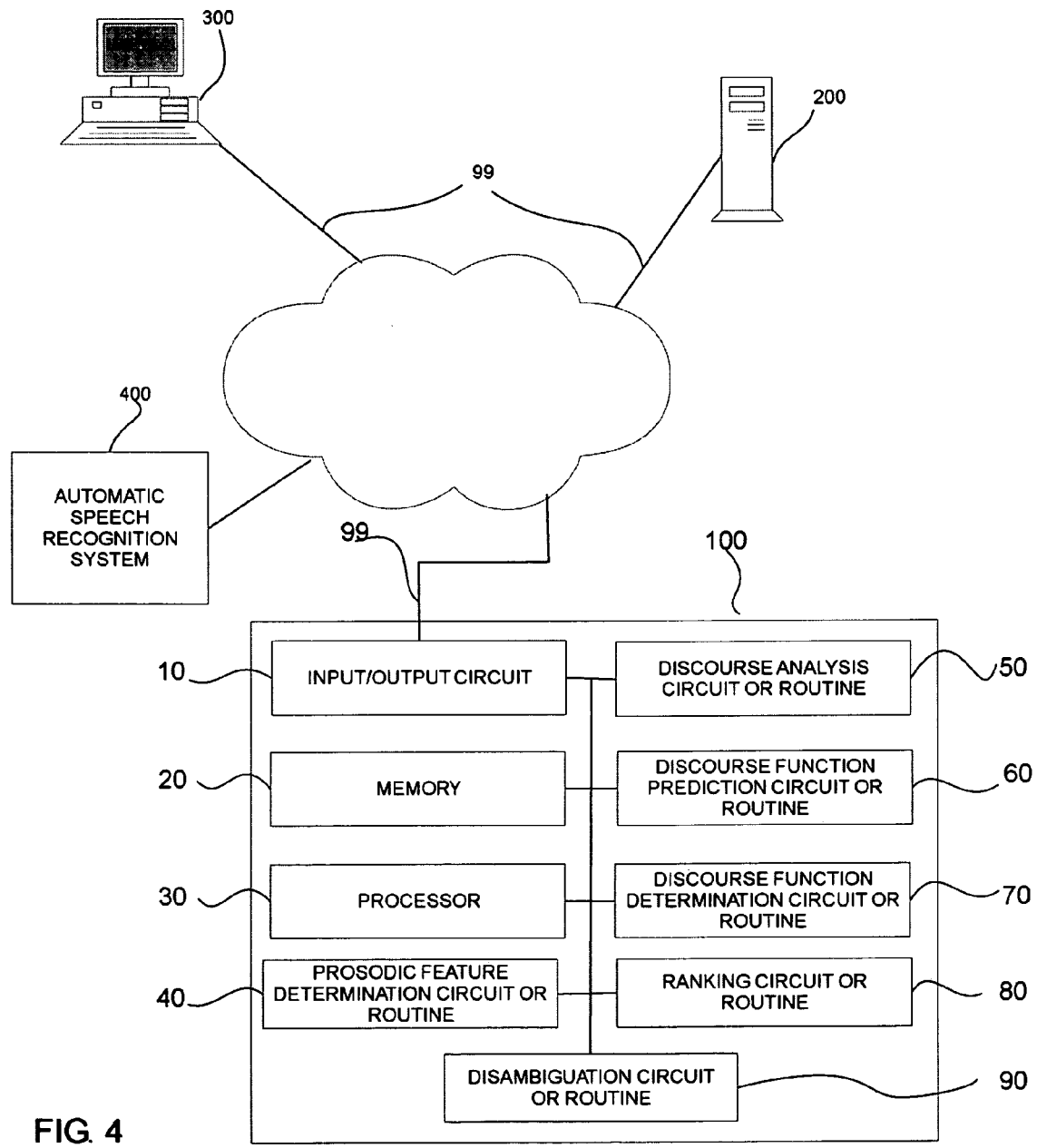
FIG. 4 is an exemplary system for resolving ambiguity according to this invention.

FIG. 4 is an exemplary system for resolving ambiguity according to this invention. The system for resolving ambiguity is comprised of a memory 20; a processor 30; a prosodic feature determination circuit or routine 40; a discourse analysis circuit or routine 50; a discourse function prediction circuit or routine 60; a discourse function determination circuit or routine 70; a ranking circuit or routine 80; and a disambiguation circuit or routine 90 each connected to input/output circuit 10; and via communications link 99, to an information repository 200; an internet enabled personal computer 300; and an automatic speech recognition system 400.

In one of the exemplary embodiments according to this invention, the user of the internet-enabled personal computer 300 enters a speech-based request for information. The speech based request is forwarded via communications link 99 to the automatic speech recognition system 400. The automatic speech recognition system 400 recognizes words and phrases in the speech-based request to form recognized speech information. The recognized speech information is then forwarded over the communications link 99 to the system for resolving ambiguity 100.

The speech based request for information is phrased as the natural language command "Please call that number with touch tone dialing". Thus, although the user of the internet-enabled personal computer 300 may intend the phrase "with touch tone dialing" to indicate the type of dialing to use in the call the user could also have intended the phrase "with touch tone dialing" to locate the number to be dialed in the telephone directory. That is, the phrase could also indicate that the number to be dialed is the number for which touch tone dialing has been enabled in the directory.

The input/output circuit 10 of the system for resolving ambiguity 100 receives the recognized speech information and saves it into memory 20. In one of the exemplary embodiments according to this invention, the processor 30 determines a theory of discourse analysis based on an entry in a user profile, a dynamic determination of the style of speech, or any other speech characteristic. The theory of discourse analysis may include but is not limited to the ULDM, Rhetorical Structures Theory, or any known or later developed discourse analysis theory capable of identifying discourse functions in the speech.

The processor 30 then activates the prosodic feature determination circuit or routine 40 to determine the prosodic features in the speech information. The prosodic features may include but are not limited to the initial pitch frequency, rate of speech, volume, stress or any other known or later developed prosodic features useful in determining discourse functions in the speech information.

The processor 30 then activates the discourse analysis circuit or routine 50 to determine the candidate discourse functions in the speech information. Discourse functions are intra-sentential and/or inter-sentential phenomena that are used to accomplish task, text and interaction level discourse activities such as giving commands to systems, initializing tasks identifying speech recipients and marking discourse level structures such as the nucleus and satellite distinction described in Rhetorical Structures Theory, the coordination, subordination and N-aries, as described in the ULDM and the like. Thus, the discourse constituents of the selected theory of discourse analysis may correlate with a type of discourse function. In other cases, the discourse function reflects a relation between elements in the discourse. The presence of more than one set of candidate discourse functions reflects alternate possible meanings associated with the speech information. After the set of candidate discourse functions have been determined, the processor 30 activates the discourse function prediction circuit or routine 60.

The discourse function prediction circuit or routine 60 uses prosodic features to predict a discourse function. Thus, given the identified prosodic features in the speech information, the discourse function prediction circuit or routine 60 returns a prediction value of the likely type of discourse function. In the exemplary embodiments according to this invention, the prediction value is a percentage or any other indicator that can be ordered and/or ranked. A prediction value is determined for each set of candidate discourse functions. Thus, some of the candidate discourse functions identified by the theory of discourse analysis may be supported by the presence of larger or smaller numbers of characteristic prosodic features. The prediction value for the candidate discourse function therefore indicates the prosodic likelihood that a candidate discourse function reflects the intended meaning of the speaker. Lower prediction values are assigned to candidate discourse function classifications that are not as strongly supported by prosodic features typically associated with the identified type of discourse function.

The processor 30 activates the ranking circuit 80 to order each set of candidate discourse functions based on the prediction value. The more likely sets of candidate discourse functions are ranked as more important.

The processor then activates the disambiguation circuit or routine 90 to resolve the ambiguity. That is, when there is more than one set of candidate discourse functions associated with the speech information, the disambiguation circuit or routine 90 selects the more likely or most highly ranked set of candidate discourse functions based on the prediction value. Thus, discourse functions that are supported by more prosodic features and/or more heavily weighted prosodic features, as indicated by the prediction value are more likely to be selected.

Figure 5:
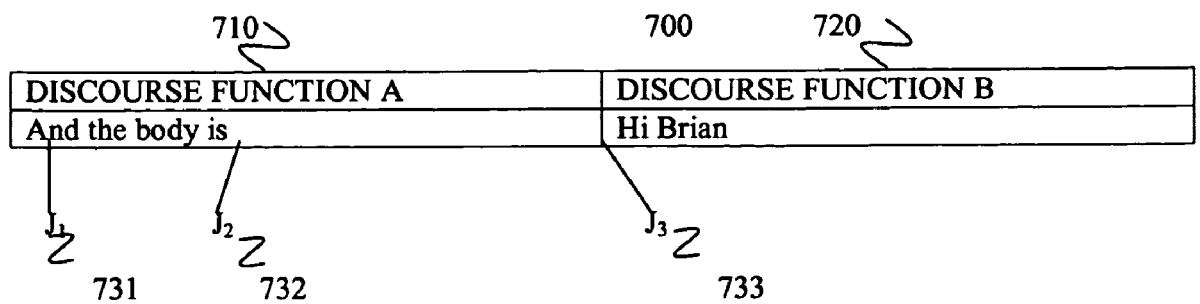
FIG. 5 shows a first exemplary sentence segmented into discourse functions according to an aspect of this invention.

FIG. 5 shows a first exemplary sentence segmented into discourse functions according to an aspect of this invention. The sentence is annotated with prosodic features $J_1$-$J_3$ 731-733 found in the speech information. The prosodic features $J_1$-$J_3$ 731-733 are used to infer a set of two candidate discourse functions for the exemplary sentence. The first of the candidate discourse functions in the set is associated with the phrase "And the body is" and the prosodic features $J_1$-$J_2$ 731-732. The second candidate discourse function is associated with the phrase "Hi Brian". The second candidate discourse function is associated with the prosodic feature $J_3$ 733. The prosodic features $J_1$-$J_3$ 731-733 are the prosodic features found in the exemplary speech information. These prosodic features are compared to characteristic prosodic features associated with discourse functions to rank the sets of discourse functions for the phrase. Thus, the exemplary sentence contains three prosodic features that can be matched and/or compared with the expected prosodic features associated with each set of candidate discourse functions.

Figure 6:
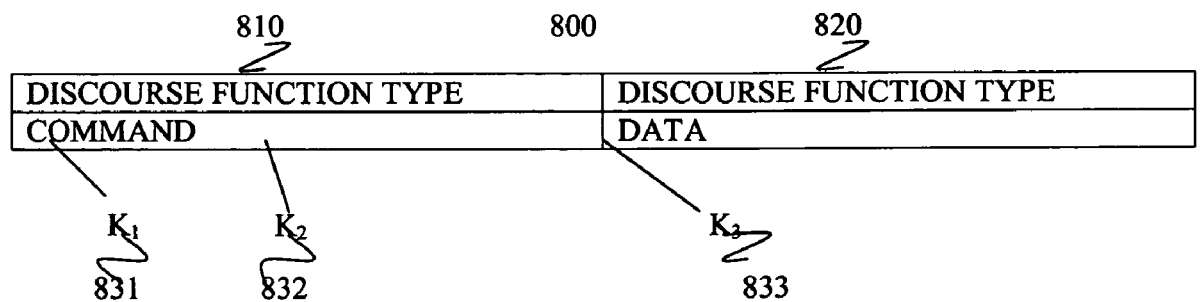
FIG. 6 show a first set of candidate discourse functions according to an aspect of this invention.

FIG. 6 show a first set of candidate discourse functions according to an aspect of this invention. The first exemplary data structure for storing candidate discourse functions is comprised of discourse functions portions 810-820. Each of the discourse function portions 810-820 in the exemplary data structure for storing candidate discourse functions is associated with expected prosodic features $K_1$-$K_3$ 831-833. The presence, absence and/or weighting of expected prosodic features is useable to rank each set of candidate discourse functions. Thus, the greater the number of expected prosodic features $K_1$-$K_3$ 831-833 that equal or match the identified prosodic features $J_1$-$J_3$ 731-733 found in the recognized speech, the more likely the set of candidate discourse functions accurately reflects the intended meaning of the speaker. That is, the correlation of identified prosodic features $J_1$-$J_3$ 731-733 with the expected prosodic features $K_1$-$K_3$ 831-833 is used to accumulate additional information about the speaker's intended meaning.

The additional information is typically in the form of expected prosodic features the user typically or characteristically uses to present and/or mark the speech information. Moreover, the prosodic features may be user specific, genre specific or based on any other consistent and identifiable characteristic of the speaker's speech pattern. Thus, if $J_1$=$K_1$, $J_2$=$K_2$ and $J_3$=$K_3$, an exemplary prediction value that can be used to rank the candidate discourse functions is based on a) the ratio of identified to expected prosodic features multiplied by the ratio of identified prosodic features to the number of matched prosodic features. In this case, the first ratio is 3 identified prosodic features to 3 expected prosodic features multiplied by 3 identified to 3 matched prosodic features. Thus, one exemplary prediction value is (3/3)*(3/3)=1.0. This prediction value is useable to rank the candidate discourse functions within the set of candidate discourse functions.

In a second example, the identified prosodic features $J_1$-$J_3$ 731-733 in the speech information relate to the expected prosodic features $K_1$-$K_3$ as follows: $J_1$<>$K_1$, but $J_2$=$K_2$ and $J_3$=$K_3$. Thus, the first ratio is 2 identified prosodic features to 3 expected prosodic features. The second ratio is 2 matched prosodic features to 3 identified prosodic features. Thus, the second exemplary prediction value is (2/3)*(2/3)=0.66.

Figure 7:
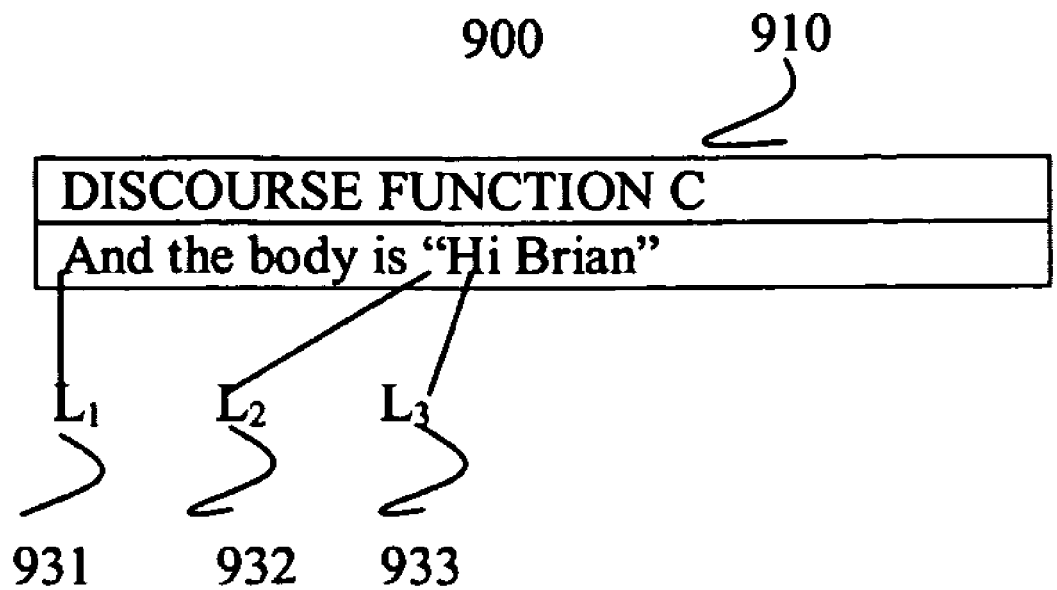
FIG. 7 shows the first exemplary sentence segmented into other discourse functions according to an aspect of this invention.

FIG. 7 shows the first exemplary sentence segmented into other discourse functions according to an aspect of this invention. The exemplary sentence is annotated with prosodic features and segmented into one candidate discourse function 910 indicating an alternate intended meaning for the phrase. The candidate discourse function 910 "And the body is 'Hi Brian'" is supported by the identified prosodic features $L_1$-$L_3$ 931-933. Thus, since 1 of the 1 expected prosodic features is found in the exemplary speech, the ratio of identified to expected features is (1/1). This ratio is multiplied by the ratio of the matched prosodic features to the identified prosodic features to get (1/1)*(1/3)=0.33. Thus, the prediction value is 33% indicating the likelihood that the speaker intended to segment the speech into the indicated candidate discourse functions 910. It will be apparent that the values are merely exemplary and that the sets of candidate discourse functions may be ranked based on any monotonically increasing function without departing from the scope of this invention.

The prediction values are used to rank the sets of candidate discourse functions. The most likely, or highest ranked or most important set of candidate discourse functions is selected as the speaker's most likely intended meaning based on the prosodic features and the theory of discourse analysis. Moreover, it will be apparent that in various other exemplary embodiments according to this invention, the predictive model for discourse functions is personalized to: the user; a speech genre, a style of speech or any other consistently identifiable characteristic of the speech.

Figure 8:
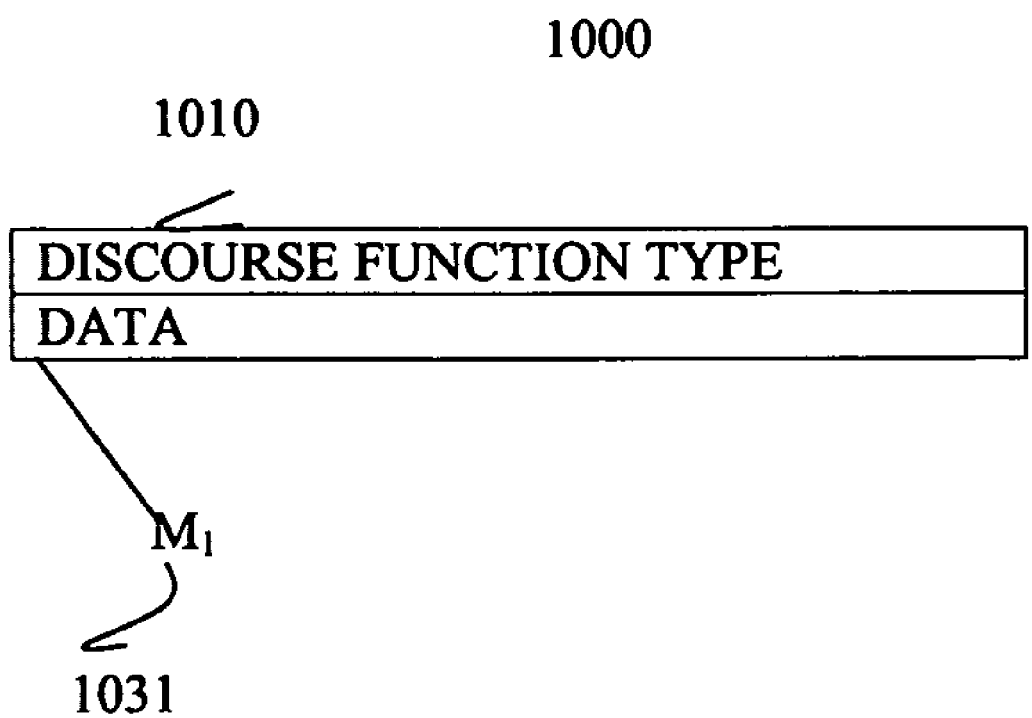
FIG. 8 show a second set of candidate discourse functions according to a first aspect of this invention.

FIG. 8 show a second set of candidate discourse functions 1000 according to a first aspect of this invention. The second set of candidate discourse functions 1000 indicates a possible alternate meaning of a speaker's utterance. The speech information is not divided between a command discourse function and a data discourse function. Instead the entire phrase is a data discourse function 1010. Thus, based on the correlation of identified prosodic features to the prosodic features expected for a command type of discourse function, a natural language interface implementing the system for resolving ambiguity might decide whether to continue in a dictation or data mode when processing this sentence.

Figure 9:
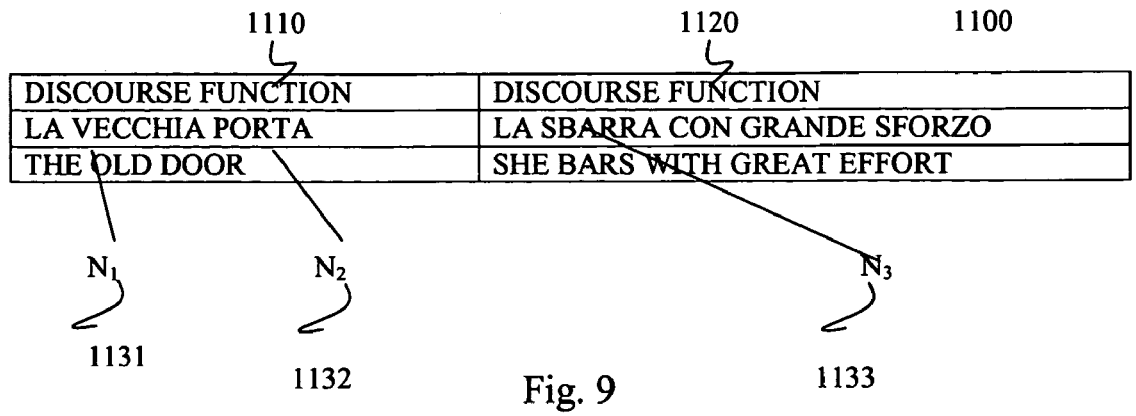
FIG. 9 shows a second exemplary sentence segmented into discourse functions according to an aspect of this invention.

FIG. 9 shows a second exemplary sentence segmented into discourse functions according to an aspect of this invention. The first discourse function 1110 contains the Italian language phrase "LA VECCHIA PORTA" corresponding to an English language gloss of "THE OLD DOOR". The second discourse function 1120 contains the Italian language phrase "LA SBARRA CON GRANDE SFORZO" which corresponds to the English language gloss "SHE BARS WITH GREAT EFFORT". The set of discourse functions 1100 is associated with the prosodic features $N_1$-$N_3$ 1131-1133. The prosodic feature $N_3$ 1133 indicates a prosodic stress placed on the "SBARRA" term in the second discourse function 1120.

Figure 10:
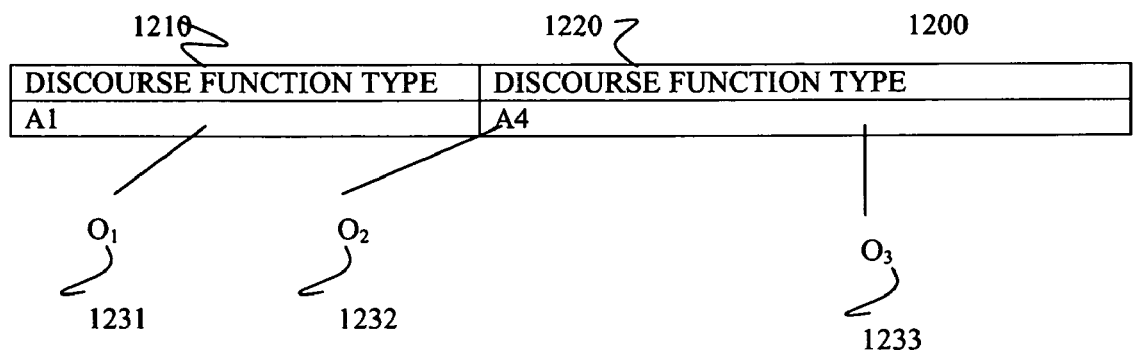
FIG. 10 shows a first set of candidate discourse functions according to an aspect of this invention.

FIG. 10 shows a first set of candidate discourse functions according to an aspect of this invention. The discourse functions are associated with expected prosodic features $O_1$-$O_2$ 1231-1232. Since the expected prosodic features $O_1$-$O_2$ 1231-1232 equal the identified prosodic features $N_1$ and $N_2$ 1131-1132, then the ratio of identified to expected features is (3/3). However, since the identified prosodic feature $N_3$ 1133 does not match, the ratio of matched to identified prosodic features is (2/3). Thus, the prediction value for the set of candidate discourse functions is (3/3)*(2/3)=0.66 or 66%.

Figure 11:
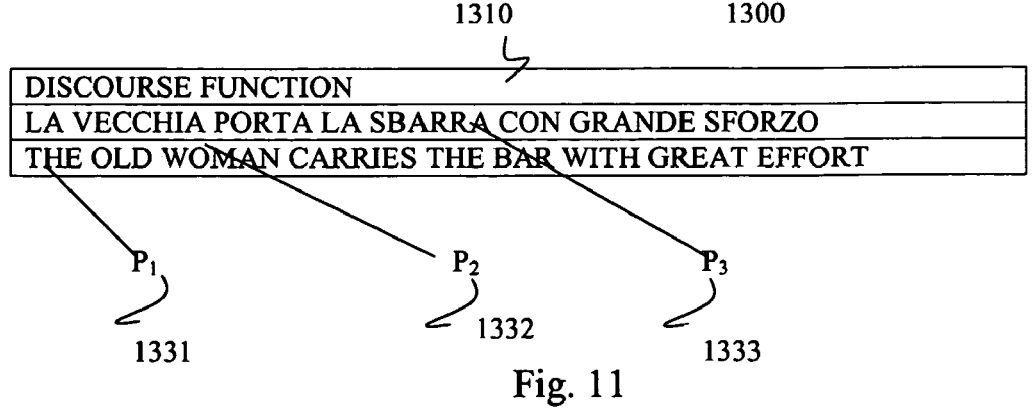
FIG. 11 shows the second exemplary sentence segmented into discourse functions according to an aspect of this invention.

FIG. 11 shows a second exemplary sentence according to an aspect of this invention. The second exemplary sentence contains a single discourse function 1310 containing the phrase "LA VECCHIA PORTA LA SBARRA CON GRANDE SFORZO" corresponding to the English language gloss "THE OLD WOMAN CARRIES THE BAR WITH GREAT EFFORT". The discourse function 1310 is associated with the identified prosodic features $P_1$-$P_3$ 1331-1333.

The identified prosodic feature $P_2$ 1332 reflects an end of word prosodic feature after "VECCHIA". Similarly, the identified prosodic feature $P_3$ 1333 reflects an end of word utterance after "SBARRA". These identified prosodic features $P_1$-$P_3$ 1331-1333 bind the constituents of the sentence and reduce the prominence of individual portions of the text.

Figure 12:
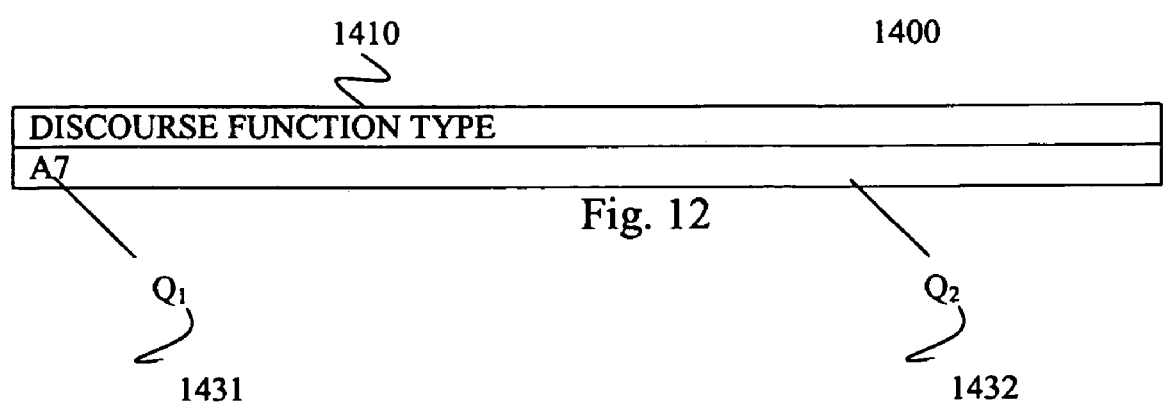
FIG. 12 shows a second set of candidate discourse functions according to an aspect of this invention.

FIG. 12 shows a second set of candidate discourse functions according to an aspect of this invention. The discourse functions are associated with the expected prosodic features $Q_1$-$Q_2$ 1431-1432. Since the expected prosodic feature $Q_1$ 1431 equals only one of the identified prosodic features $P_1$ 1331, the ratio of identified to expected features is (1/2). The identified prosodic feature $P_2$ 1332 is not matched, therefore, the ratio of matched to identified prosodic features is (1/2). Thus, the prediction value for the set of candidate discourse functions is (1/2)*(1/2)=0.25 or 25%.

Figure 13:
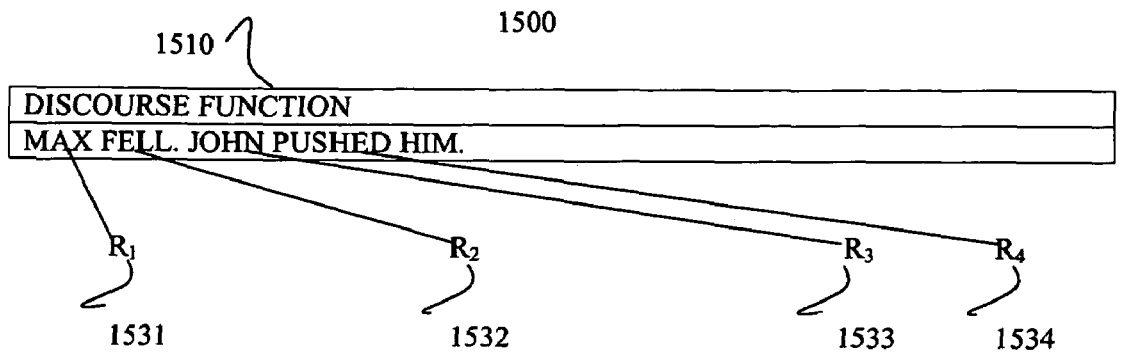
FIG. 13 shows a two sentence dialogue.

FIG. 13 shows a two sentence dialogue. The sentences are related by a discourse function that indicates the temporal sequence and/or importance. The first phrase "MAX FELL" is associated with a first event. The second sentence "JOHN PUSHED HIM" is associated with a second event. The two sentence dialogue 1500 contains the prosodic features $R_1$-$R_4$ 1531-1534. The two sentence dialogue 1500 contains temporal ambiguity as to which event occurred first and/or whether one event caused the second event.

The prosodic feature $R_3$ 1533 indicates an exemplary prosodic stress placed on the "JOHN" term in the second discourse function 1520 of the two sentence dialogue 1500. The prosodic feature $R_3$ 1533 on the "JOHN" term provides an indication of the intended temporal ordering of the events and thus, the intended meaning of the sentence. The emphasis on "John" may be used to subordinate the phrase "MAX FELL" to the phrase "JOHN PUSHED HIM". The subordination is then used to infer that John's push was the cause of Max's fall. The prosodic feature $R_3$ 1533 is merely illustrative. Thus, it will apparent that in various other exemplary embodiments according to this invention, various other consistently presented prosodic features may also be used to indicate the relationship between the events.

Figure 14:
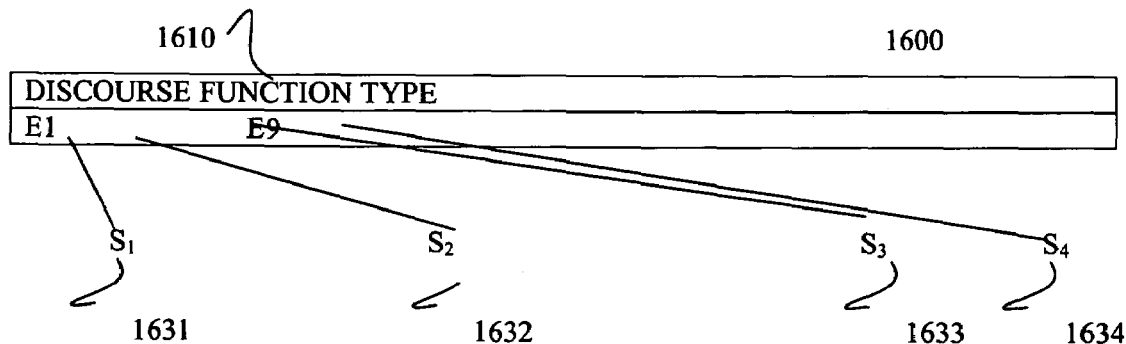
FIG. 14 shows a first set of candidate discourse functions according to an aspect of this invention.

FIG. 14 shows a first set of candidate discourse functions according to an aspect of this invention. The discourse function reflects a temporal ordering of the events "E1" and "E9". The events "E1" and "E9" are associated with expected prosodic features $S_1$-$S_4$. Since the expected prosodic features $S_1$-$S_4$ 1631-1633 equal the identified prosodic features $R_1$-$R_4$ 1531-1534, the ratio of identified to expected features is (4/4). Also, the ratio of identified prosodic features to the matched prosodic features is (4/4). Thus, the prediction value for the set of candidate discourse functions is (4/4)*(4/4)=1.00 or 100%.

Figure 15:
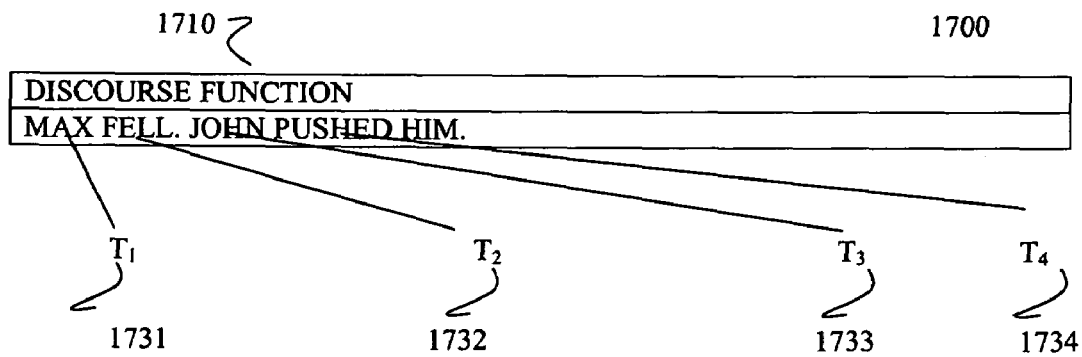
FIG. 15 shows the two sentence dialogue segmented into discourse functions according to an aspect of this invention.

FIG. 15 shows a two sentence dialogue according to an aspect of this invention. The exemplary sentence reflects an alternate temporal ordering of events in the dialogue. The first and second sentences are associated with identified prosodic features $T_1$-$T_4$ 1731-1734. The prosodic feature $T_3$ 1733 reflects a lack of stress on the first portion of the second sentence. Thus, the relation between the events is inferred to be a narrative discourse function. That is, the second event is not indicated as being necessarily caused by the first event.

Figure 16:
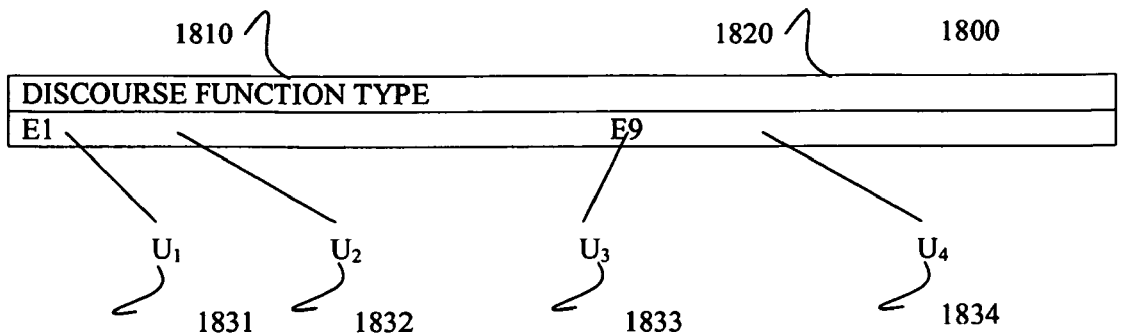
FIG. 16 shows a second exemplary set of candidate discourse functions according to an aspect of this invention.

FIG. 16 shows a second exemplary set of candidate discourse functions according to an aspect of this invention. The labeled events "E1" and "E9" reflect the temporal ordering of the events. The discourse functions "E" and "E9" are associated with expected prosodic features $U_1$-$U_4$ 1831-1834. In this example, the expected prosodic features $U_1$-$U_4$ 1831-1834 do not equal any of the identified prosodic features $T_1$-$T_4$ 1731-1734. Therefore, the ratio of identified to expected features is (0/4). The ratio of identified prosodic features to the matched prosodic features is also (0/4). Thus, the prediction value for the set of candidate discourse functions is (0/4)*(0/4)=0 or 0%.

Figure 17:
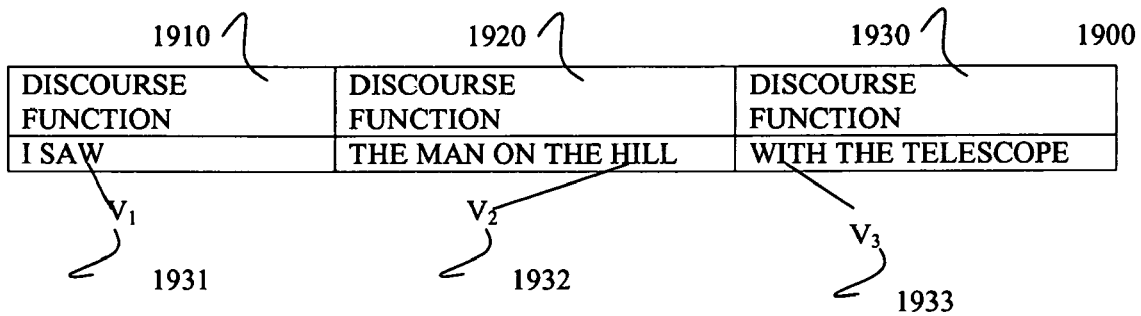
FIG. 17 shows a third exemplary sentence segmented into discourse functions according to an aspect of this invention.

FIG. 17 shows a third exemplary sentence according to another aspect of this invention. The first discourse function 1910 contains the phrase "I SAW", the second discourse function 1920 contains "THE MAN ON THE HILL" and the third discourse function 1930 contains the phrase "WITH THE TELESCOPE". The sentence 1900 is associated with identified prosodic features $V_1$-$V_3$ 1931-1933. The identified prosodic features $V_1$ and $V_3$ 1931 and 1933, indicate the intonational prominence of the terms "SAW" in the first discourse function 1910 and the term "with" in the third discourse function 1930. In this reading of the meaning, the man on the hill was seen with the aid of the telescope, as indicated by the prosodic features and discourse functions.

Figure 18:
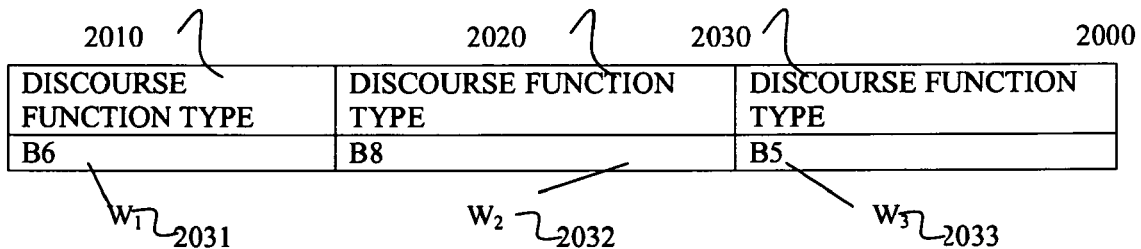
FIG. 18 shows a first set of candidate discourse functions according to an aspect of this invention.

FIG. 18 shows a first set of candidate discourse functions according to an aspect of this invention. The set of candidate discourse functions 2000 is comprised of first through third discourse functions 2010-2030. The first-third discourse functions 2010-2030 are associated with expected prosodic features $W_1$-$W_3$ 2031-2033. Although identified prosodic features $V_1$ 1931 and $V_2$ 1932 are equal to the expected prosodic features $W_1$ 2031 and $W_2$ 2032, the expected prosodic feature $W_3$ 2033 does not equal any of the identified prosodic features. Therefore, the ratio of identified to expected features is (2/3) and the ratio of matched prosodic features to the identified prosodic features is (2/3). Thus, the prediction value for the set of candidate discourse functions is (2/3)*(2/3)=0.66 or 66%.

Figure 19:
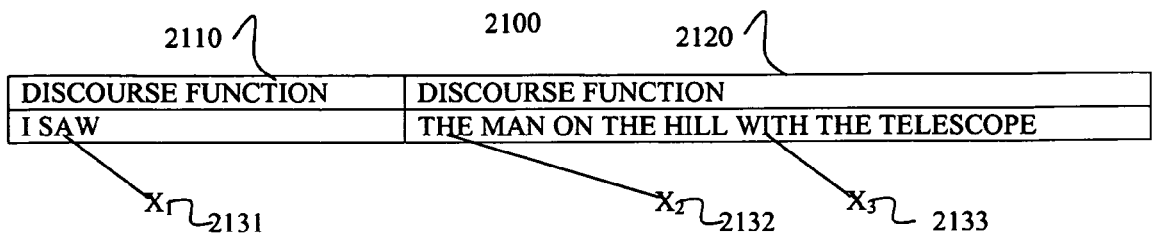
FIG. 19 shows the third exemplary sentence segmented into discourse functions according to an aspect of this invention.

FIG. 19 shows the third exemplary sentence according to an aspect of this invention. The exemplary sentence is associated with identified prosodic features $X_1$-$X_2$ 2131-2132. Prosodic features $X_1$-$X_2$ 2131-2132 reduce the prominence of the "WITH THE TELESCOPE" modifier portion of the phrase to bind or attach the modifier to the phrase "THE MAN ON THE HILL". Thus, the meaning of the sentence is clarified to reflect that the man on the hill had the telescope.

Figure 20:
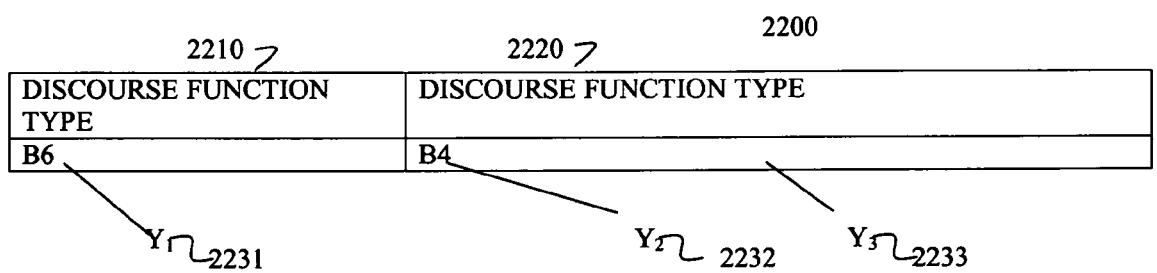
FIG. 20 shows a second set of candidate discourse functions according to an aspect of this invention.

FIG. 20 shows a second set of candidate discourse functions according to an aspect of this invention. The discourse functions are associated with expected prosodic features $Y_1$-$Y_3$ 2231-2233. The expected prosodic features $Y_1$-$Y_3$ 2231-2233 equal the identified prosodic features $X_1$-$X_3$ 2131-2133, therefore, the ratio of identified to expected features is (3/3) and the ratio of matched to identified prosodic features is (3/3). Thus, the prediction value for the set of candidate discourse functions is (3/3)* (3/3)=1.00 or 100%.

Figure 21:
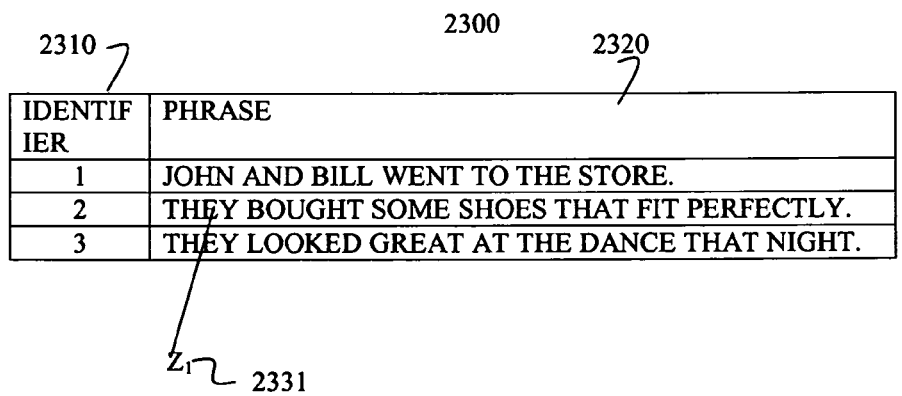
FIG. 21 shows an exemplary three phrase discourse.

FIG. 21 shows an exemplary three phrase discourse. The phrases 2320 in the discourse are associated with identifiers 2310. The phrase identifiers 2310 are used to reference or index into the discourse.

The first row associates a phrase identifier value of "1" with the phrase "John and Bill went to the store". The second row associates the phrase identifier value of "2" with the phrase "They bought some shoes that fit perfectly". The third row associated the phrase identifier "3" with the phrase "They looked great at the dance that night". The term "they" in the third phrase creates an ambiguous reference in the discourse that could refer to either: 1) John and Bill; or 2) the perfectly fitting shoes. The prosodic feature $Z_3$ 2331 is used to help resolve the ambiguity in spoken discourse.

Figure 22:
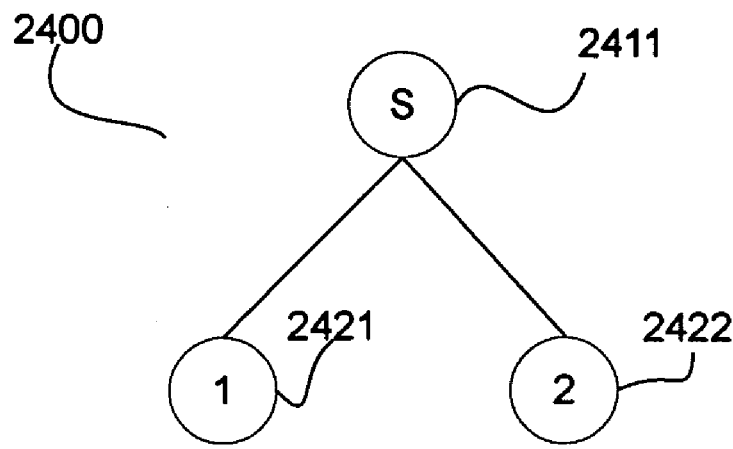
FIG. 22 shows an exemplary first structural representation of discourse.

FIG. 22 shows an exemplary first structural representation of discourse 2400. The exemplary first structural representation includes a subordination relation 2411 that relates the first phrases 2421 to the second phrase 2422 based on the ULDM theory of discourse analysis. The first structural representation of discourse illustrates that the term "They" in the second phrase refers to "John and Bill".

Figure 23:
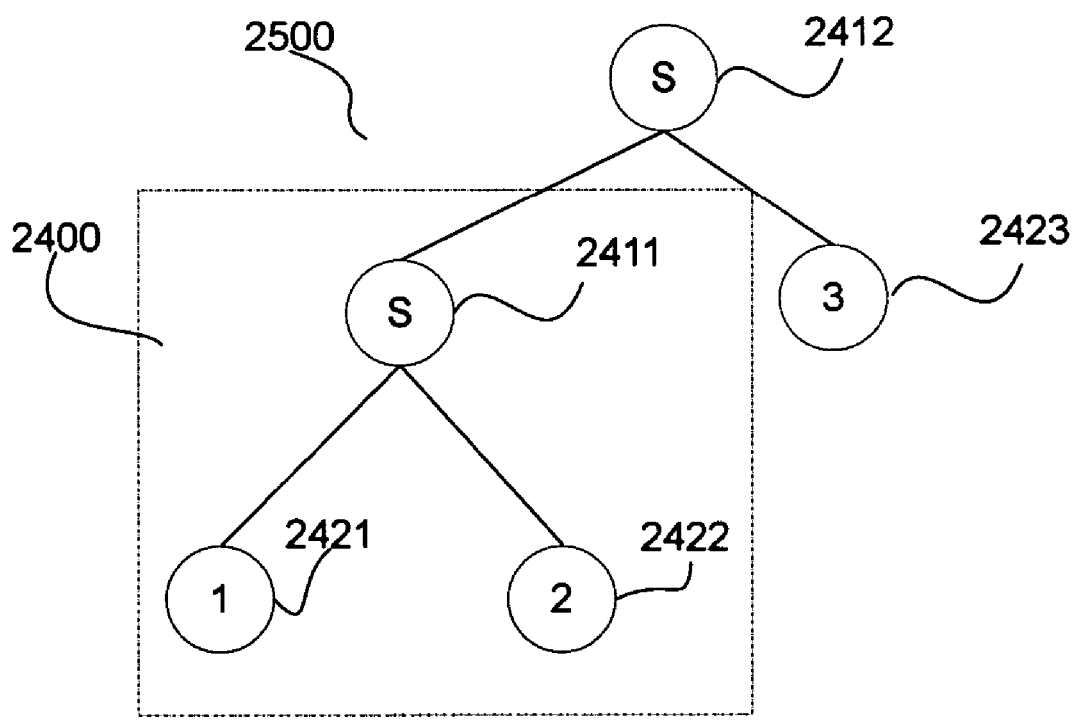
FIG. 23 shows a first set of candidate discourse functions as a second exemplary structural representation of discourse.

FIG. 23 shows a first set of candidate discourse functions as a second exemplary structural representation of discourse 2500. The second exemplary structural representation of discourse 2500 reflects another means of representing the set of candidate discourse functions according to this invention. The second structural representation illustrates adding the third phrase 2423 to the structural representation of discourse. The subtree of the first structural representation of discourse 2400 is related to the third phrase 2423 by a parent subordination node 2412. This is associated with a reading of the sentence in which the term "They" in the third phrase refers to John and Bill. This reading of the discourse is supported and/or contradicted by, for example, one or more identified prosodic features associated with the word "They" in the third phrase 2423.

Figure 24:
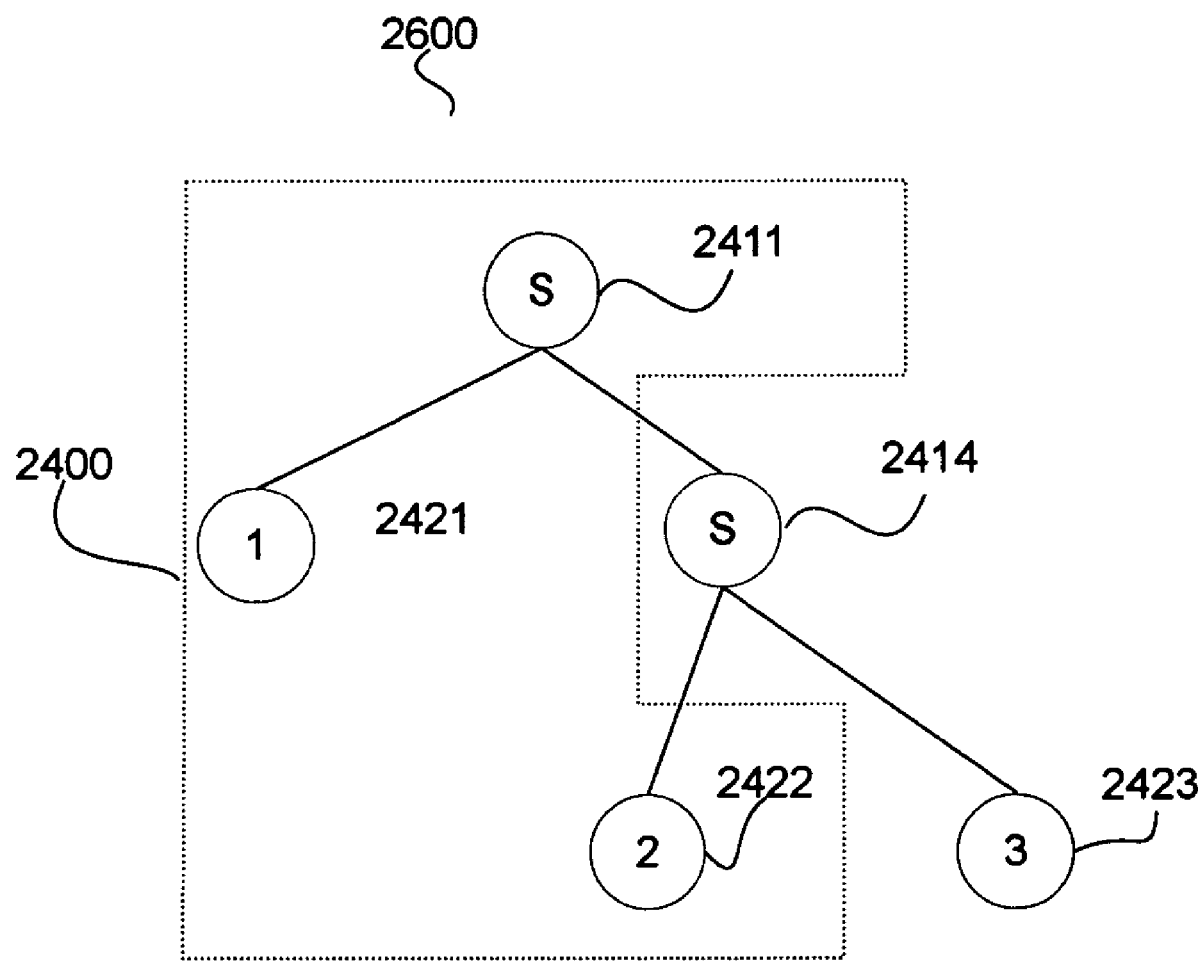
FIG. 24 shows a third exemplary structural representation of discourse.

FIG. 24 shows a third exemplary structural representation of discourse 2600. The third structural representation of discourse 2600 illustrates an alternate relation between the third phrase 2423 and the first structural representation of discourse 2400. A subordination node 2414 is inserted between the second phrase 2422 and the parent subordination node 2411 based on the prosodic features. The second subordination node 2414 relates the second phrase 2422 to the third phrase 2423. This reflects a reading of the three sentence discourse in which the term "They" in the third phrase 2423 refers to the shoes instead of John and Bill. That is, the theory of discourse analysis defines constraints on the candidate attachment and/or insertion points in a structural representation of discourse representative of the on-going dialogue or discourse. The prosodic features combined with the discourse function are then used in selecting among the candidate attachment and/or insertion points to resolve the ambiguity.

FIG. 25 shows an exemplary data structure for storing ranked sets of candidate discourse functions according to an aspect of this invention. The exemplary data structure for storing ranked sets of candidate discourse functions 2700 is comprised of a rank portion and 2710 and a discourse function portion 2720. The prediction value portion 2710 contains a measure or rank indicating the relative likelihood that the set of candidate discourse functions reflect the intended meaning of the speaker.

In one of the exemplary embodiments according to this invention, the measure or rank is based on the number of prosodic features found in the speech and shared with the relevant set of candidate discourse functions. The first row of the exemplary data structure for storing ranked sets of candidate discourse functions contains the value "1.0" in the rank portion 2710. This indicates that the associated discourse functions have a score of 100% and most likely represent the intended meaning of the speaker. The discourse function portion 2720 contains the value "DISCOURSE_FUNCTION_A+DISCOURSE_FUNCTION_B". This indicates the candidate or proposed discourse function segmentation associated with the prediction value.

The second row of the exemplary data structure for storing ranked sets of candidate discourse functions contains the value "0.33" in the prediction value portion 2710. This indicates that the candidate discourse functions in the first row are more likely to reflect the speaker's intended meaning than the second row candidate discourse functions. The discourse function portion of the second row contains the value "DISCOURSE_FUNCTION_C". This indicates the proposed segmentation of the phrase into discourse functions that least likely reflects the intended meaning of the speaker.

Each of the circuits 10-90 of the system for resolving ambiguity 100 described in FIG. 3 can be implemented as portions of a suitably programmed general-purpose computer. Alternatively, circuits 10-90 of the system for resolving ambiguity 100 outlined above can be implemented as physically distinct hardware circuits within an ASIC, or using a FPGA, a PDL, a PLA or a PAL, or using discrete logic elements or discrete circuit elements. The particular form each of the circuits 10-90 of the system for resolving ambiguity 100 outlined above will take is a design choice and will be obvious and predicable to those skilled in the art.

Moreover, the system for resolving ambiguity 100 and/or each of the various circuits discussed above can each be implemented as software routines, managers or objects executing on a programmed general purpose computer, a special purpose computer, a microprocessor or the like. In this case, the system for resolving ambiguity 100 and/or each of the various circuits discussed above can each be implemented as one or more routines embedded in the communications network, as a resource residing on a server, or the like. The system for resolving ambiguity 100 and the various circuits discussed above can also be implemented by physically incorporating the system for resolving ambiguity 100 into software and/or a hardware system, such as the hardware and software systems of a web server or a client device.

As shown in FIG. 3, memory 20 can be implemented using any appropriate combination of alterable, volatile or non-volatile memory or non-alterable, or fixed memory. The alterable memory, whether volatile or non-volatile, can be implemented using any one or more of static or dynamic RAM, a floppy disk and disk drive, a write-able or rewriteable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication links 99 shown in FIGS. 1, and 3 can each be any known or later developed device or system for connecting a communication device to the system for resolving ambiguity 100, including a direct cable connection, a connection over a wide area network or a local area network, a connection over an intranet, a connection over the Internet, or a connection over any other distributed processing network or system. In general, the communication links 99 can be any known or later developed connection system or structure usable to connect devices and facilitate communication.

Further, it should be appreciated that the communication links 99 can be wired or wireless links to a network. The network can be a local area network, a wide area network, an intranet, the Internet, or any other distributed processing and storage network.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method of resolving ambiguity comprising the steps of:
   determining recognized speech information;
   determining discourse functions in the recognized speech information;
   determining a predictive model of discourse functions based on prosodic features;
   determining at least one set of candidate discourse functions for the recognized speech information;
   determining a rank of the at least one set of discourse functions based on the predictive model of discourse functions; and
   resolving the ambiguity between the set of at least one discourse functions based on the determined rank.

2. The method of claim 1, wherein the discourse functions are determined based on a theory of discourse analysis.

3. The method of claim 2, in which the theory of discourse analysis is at least one of: the Linguistic Discourse Model; the Unified Linguistic Discourse Model; Rhetorical Structures Theory; Discourse Structure Theory; and Structured Discourse Representation Theory.

4. The method of claim 1, wherein the recognized speech information is directed to at least one of: a dictation mode; and a command mode.

5. The method of claim 1, in which the prosodic features occur in at least one of: a location preceding; within; and following the associated discourse function.

6. The method of claim 1, in which the prosodic features are encoded within a prosodic feature vector.

7. The method of claim 6, in which the prosodic feature vector is a multimodal feature vector.

8. The method of claim 1, in which the discourse function is an intra-sentential discourse function.

9. The method of claim 1, in which the discourse function is an inter-sentential discourse function.

10. A system for synthesizing speech using discourse function level prosodic features comprising:
    an input/output circuit for retrieving recognized speech and prosodic features;
    a processor that determines at least one set of candidate discourse functions in the recognized speech information; determines a predictive model of discourse functions; determines a rank of the at least one set of candidate discourse functions based on the predictive model of discourse functions and the prosodic features of the recognized speech and disambiguates between the at least one set of candidate discourse functions based on a measure of prosodic correlation between the prosodic features for the recognized speech and the expected prosodic features associated with each discourse function in the predictive model of discourse functions.

11. The system of claim 10, wherein the discourse functions are determined based on a theory of discourse analysis.

12. The system of claim 11, in which the theory of discourse analysis is at least one of: the Linguistic Discourse Model; the Unified Linguistic Discourse Model Rhetorical Structures Theory; Discourse Structure Theory; and Structured Discourse Representation Theory.

13. The system of claim 10, wherein the recognized speech information is directed to at least one of: a dictation mode; and a command mode.

14. The system of claim 10, in which the prosodic features occur in at least one of: a location preceding; within; and following the associated discourse function.

15. The system of claim 11, in which the prosodic features are encoded within a prosodic feature vector.

16. The system of claim 15, in which the prosodic feature vector is a multimodal feature vector.

17. The system of claim 11, in which the discourse function is an intra-sentential discourse function.

18. The system of claim 11, in which the discourse function is an inter-sentential discourse function.

19. Computer readable storage medium comprising: computer readable program code embodied on the computer readable storage medium, the computer readable program code usable to program a computer to resolve ambiguity comprising the steps of:
    determining recognized speech information;
    determining discourse functions in the recognized speech information;
    determining a predictive model of discourse functions based on prosodic features;
    determining at least one set of candidate discourse functions for the recognized speech information;
    determining a rank of the at least one set of discourse functions based on the predictive model of discourse functions; and
    resolving the ambiguity between the set of at least one discourse functions based on the determined rank.

* * * * *